United States Patent
Broussard

(10) Patent No.: US 7,648,630 B2
(45) Date of Patent: Jan. 19, 2010

(54) UNDERWATER FILTRATION OPERATOR

(76) Inventor: Ronney L. Broussard, P.O. Box 490, Pollock, LA (US) 71467

( * ) Notice: Subject to any disclaimer, the term of this patent is extended or adjusted under 35 U.S.C. 154(b) by 24 days.

(21) Appl. No.: 12/075,554

(22) Filed: Mar. 12, 2008

(65) Prior Publication Data
US 2009/0230042 A1  Sep. 17, 2009

(51) Int. Cl.
*B01D 35/05* (2006.01)
*B01D 24/14* (2006.01)

(52) U.S. Cl. .......................... 210/170.05; 210/170.09; 210/242.1; 210/243; 210/274; 210/275; 210/290; 405/127

(58) Field of Classification Search ............... 210/122, 210/155, 162, 170.05, 170.06, 170.09, 242.1, 210/243, 274, 275, 290, 333.1, 416.1; 405/127
See application file for complete search history.

(56) References Cited

U.S. PATENT DOCUMENTS

| | | | |
|---|---|---|---|
| 167,546 A | 9/1875 | Lefferts | |
| 344,813 A | 7/1886 | Bull et al. | |
| 364,599 A | 6/1887 | Morris | |
| 623,782 A | 4/1899 | Hammett | |
| 763,325 A * | 6/1904 | Roche | 210/242.1 |
| 869,558 A | 10/1907 | Durbrow | |
| 882,030 A | 3/1908 | Traulsen | |
| 975,450 A * | 11/1910 | Ouimet | 210/170.09 |
| 1,200,126 A | 10/1916 | Mitchell | |
| 2,552,493 A * | 5/1951 | Newton | 210/170.1 |
| 3,120,491 A | 2/1964 | Kincade | 210/242 |
| 4,118,322 A * | 10/1978 | San Roman | 210/274 |
| 4,606,819 A | 8/1986 | Colson | 210/122 |
| 4,643,836 A | 2/1987 | Schmid | 210/795 |
| 4,657,672 A | 4/1987 | Allen | 210/94 |
| 4,950,393 A | 8/1990 | Goettl | 210/169 |
| 5,160,039 A | 11/1992 | Colburn | 210/150 |
| 5,256,310 A | 10/1993 | Brooks | 210/747 |
| 5,445,111 A | 8/1995 | Smith | 119/220 |
| 5,549,828 A | 8/1996 | Ehrlich | 210/602 |
| 5,565,096 A * | 10/1996 | Phelan | 210/170.06 |
| 6,027,639 A | 2/2000 | Lenhart, Jr. | 210/108 |
| 6,508,933 B2 * | 1/2003 | Wilkins et al. | 210/170.09 |
| 6,660,170 B2 * | 12/2003 | Dreyer et al. | 210/170.05 |
| 6,773,606 B2 * | 8/2004 | Wilkins et al. | 210/170.08 |
| 6,790,345 B2 | 9/2004 | Broussard | 210/122 |

* cited by examiner

*Primary Examiner*—Christopher Upton
(74) *Attorney, Agent, or Firm*—John M. Harrison

(57) ABSTRACT

An underwater filtration system or operator which can be floated on and suspended in a river, lake, pond or other water body to filter water from the water body. The underwater filtration operator may be electrically charged with simultaneous introduction of continuous forced air to remove impurities from the water body and increase filtering efficiency and the system includes a split housing having a selected configuration and divided into one or more filtration units, each of which includes a filter medium or mediums for filtering water from the water body. A pump is provided in the interior of the system housing for receiving the filtered water from the filtration units and pumping the filtered water to a collection tank or dispenser, directly to an end user or to a reverse-osmosis water filtration unit for further filtration. This unique operator allows selected individual filtration compartments to be backwashed while other filtration compartments are producing filtered water without the necessity of an external clean water storage tank.

15 Claims, 7 Drawing Sheets

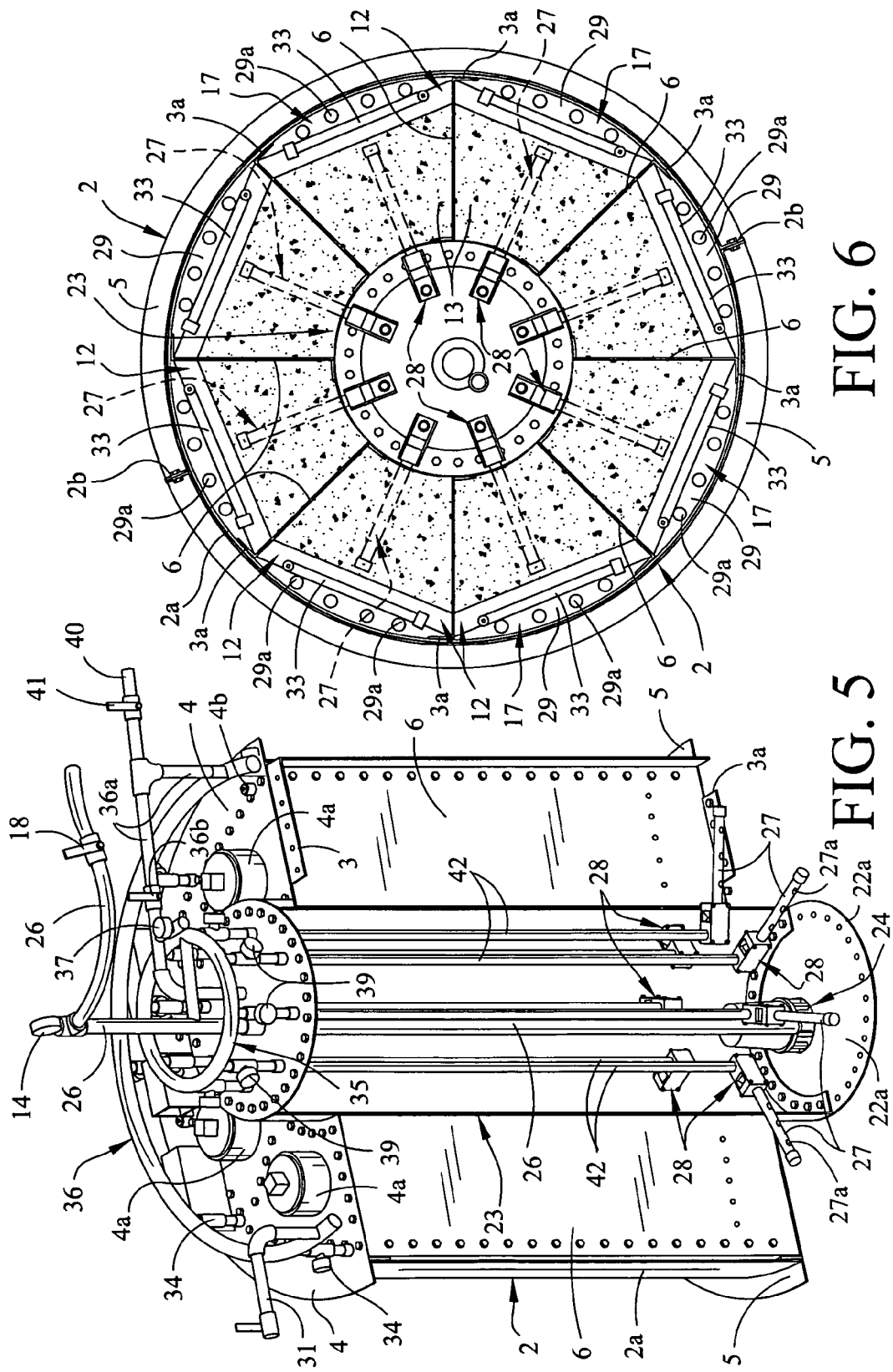

UNDERWATER FILTRATION OPERATOR

BACKGROUND OF THE INVENTION

1. Field of the Invention

This invention relates to water filters and more particularly, to an underwater filtration system or operator which can be floated on a water body to filter and disinfect water from the water body for drinking or other purposes. The underwater filtration operator includes a typically split housing having a selected configuration and divided into multiple filtration units which receive water from the water body, each of which filtration units includes at least one, and preferably, two filter elements or medium, for filtering the water. A pump is provided in the housing for pumping the filtered water to a suitable container or dispenser or to a reverse-osmosis filtration unit for further filtration, and a positive electrical charge may be applied to the housing in conjunction with the introduction of forced air into a raw water chamber, to neutralize negatively charged impurities in the raw incoming water flowing through the filter media and improve filtration efficiency.

Treatment processes for filtering surface water have remained virtually unchanged for over half a century. Many surface water treatment plants utilize large settling basins, known as clarifiers, to settle out heavy solids from water prior to fine-screening the water, using rapid sand filters. Some of these treatment plants use a mixing chamber clarifier to separate the heavy solids from the water. Such a mixing chamber clarifier requires the introduction of polymers, lime, alum or other types of media into the water to be treated, which media bind particulate impurities in the water and fall with the bound impurities to the bottom of the mixing chamber. The filtered water, substantially devoid of the larger impurities, is then typically processed through horizontal sand filters which remove smaller impurities from the water. The sand filters must be periodically backwashed using large quantities of clean water because they repeatedly become clogged with the smaller particles that were not removed from the water during the clarification process. The fewer the particles removed during the clarification process, the more often the backwashing procedure must be repeated.

The foregoing types of surface water treatment plants are associated with many problems due to the nature of their operation. Numerous pumps and an expensive and elaborate intake structure must be installed in the water supplies to conduct the water to the plants for treatment. Another problem involves the disposal of solids that are removed from the water. Formerly, these solids, along with the chlorine, polymers, lime or other particulate binding media, were pumped back into the pre-filtered water from which they were removed. Due to recent environmental legislation, however, it is no longer lawful to discharge the particulate binding media into the pre-filtered water supply, as these materials are not endemic to the water that is being treated. Another problem associated with these filtration systems is that the polymers or other particle binding media introduced into the filtration system are harmful to certain types of boiler water industrial filtration equipment which utilizes reverse osmosis. This increases the cost of boiler water for industrial consumers. Furthermore, disinfectant chemicals introduced into the filtered water do not always kill all parasites found in water sources. Moreover, rapid sand filters cannot remove all of these parasites, some of which remain in the water and present a potentially dangerous health risk. Another problem associated with these surface water treatment plants is the inability to remove harmful chemicals which may contaminate the water supply by agricultural run-off or accidental spills. Accordingly, surface treatment plants can be costly and time-consuming to build and maintain.

A number of different types of filters are known in the art for filtering surface water. Patents of interest in this regard include U.S. Pat. No. 4,606,819, issued Aug. 19, 1986, to Colson; U.S. Pat. No. 4,643,836, issued Feb. 17, 1987, to Schmid; U.S. Pat. No. 4,657,672, issued Apr. 14, 1987, to Allen; U.S. Pat. No. 4,950,393, issued Aug. 21, 1990, to Goettl; U.S. Pat. No. 5,160,039, issued Nov. 3, 1992, to Colburn; U.S. Pat. No. 5,549,828, issued Aug. 27, 1996, to Ehrlich; arid U.S. Pat. No. 6,027,639, issued Feb. 22, 2000, to J. Lenhart et al. My U.S. Pat. No. 6,790,345, issued Sep. 14, 2004, details an underwater filtration operator for floating on a water body and producing clarified water from the water body.

SUMMARY OF THE INVENTION

These and other objects of the invention are provided in an underwater filtration system or operator and method of filtering water in a water body, which device can be floated on and suspended in a lake, river, pond or other water body to filter water from the water body. The underwater filtration system includes a typically split housing having a selected configuration, typically cylindrical, and enclosing multiple, pie-shaped filtration units, each of which units includes at least one, and preferably two filter elements or medium for filtering water from the water body. A pump is provided in the housing interior for receiving the filtered water from all or selected ones of the filtration units and pumping the filtered water to facilitate back-washing of individual filtration compartments or to a suitable collection facility or dispenser, or to a reverse osmosis filter for further treatment. Selected ones or all of the units may be backwashed at any time to clean the filter element(s) while the remaining units remain on-line in the filtration process. The insulated housing element of the operator may be positively charged with electricity, in conjunction with the introduction of forced air into the raw water chamber, to neutralize negatively charged impurities flowing through the filter media with the raw entry water and enhance the filtration efficiency.

BRIEF DESCRIPTION OF THE DRAWINGS

The invention will be better understood by reference to the accompanying drawings, wherein:

FIG. 5 is a sectional view, taken along section lines 5-5 in FIG. 1, of the underwater filtration operator;

FIG. 6 is a sectional view, taken along section lines 6-6 in FIG. 1, of the underwater filtration operator;

DESCRIPTION OF THE PREFERRED EMBODIMENTS

Figure 1:
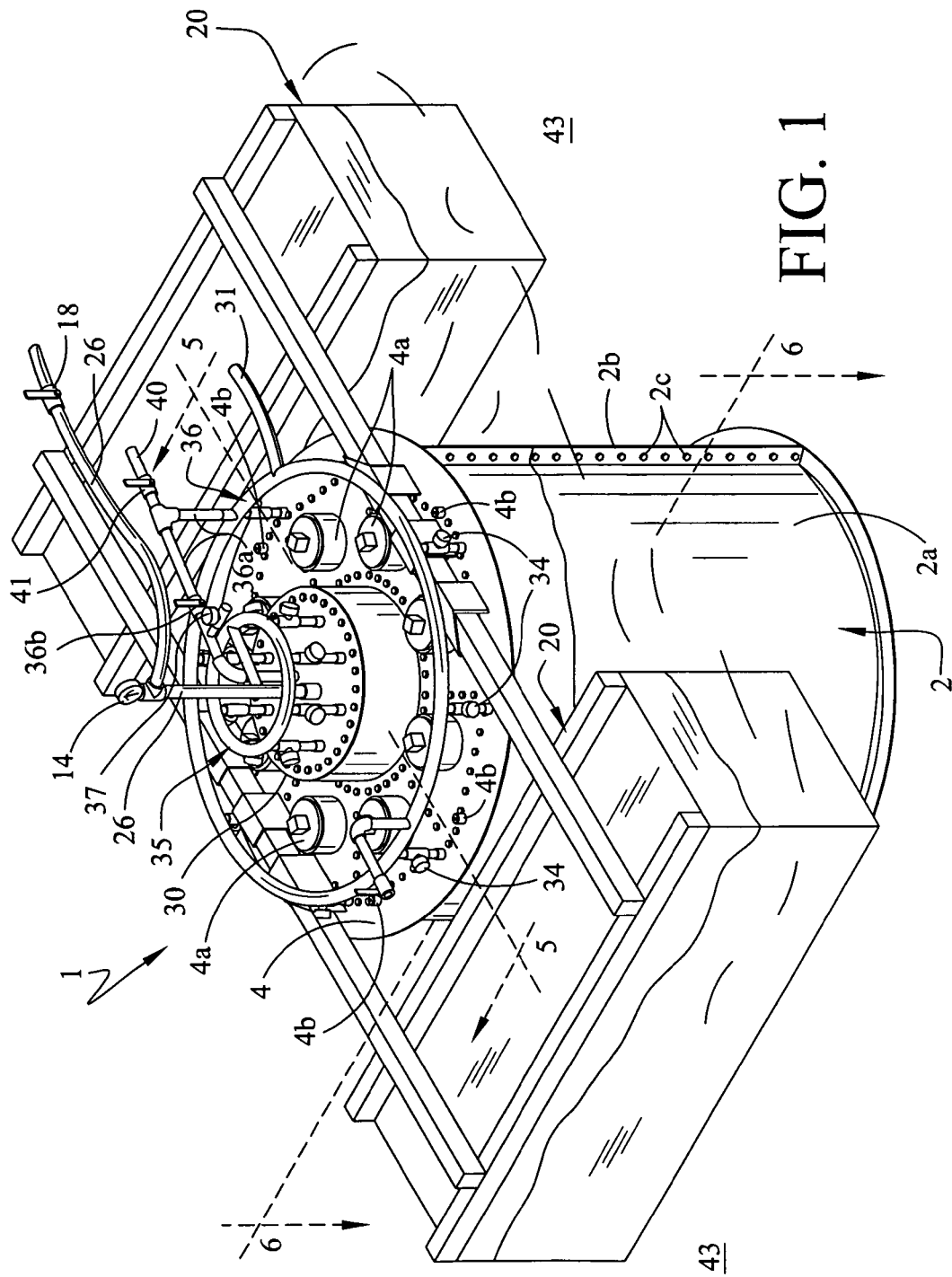
FIG. 1 is a perspective view of a first illustrative embodiment of the underwater filtration system of this invention having a flotation collar for floating the device on a water body.
Figure 2:
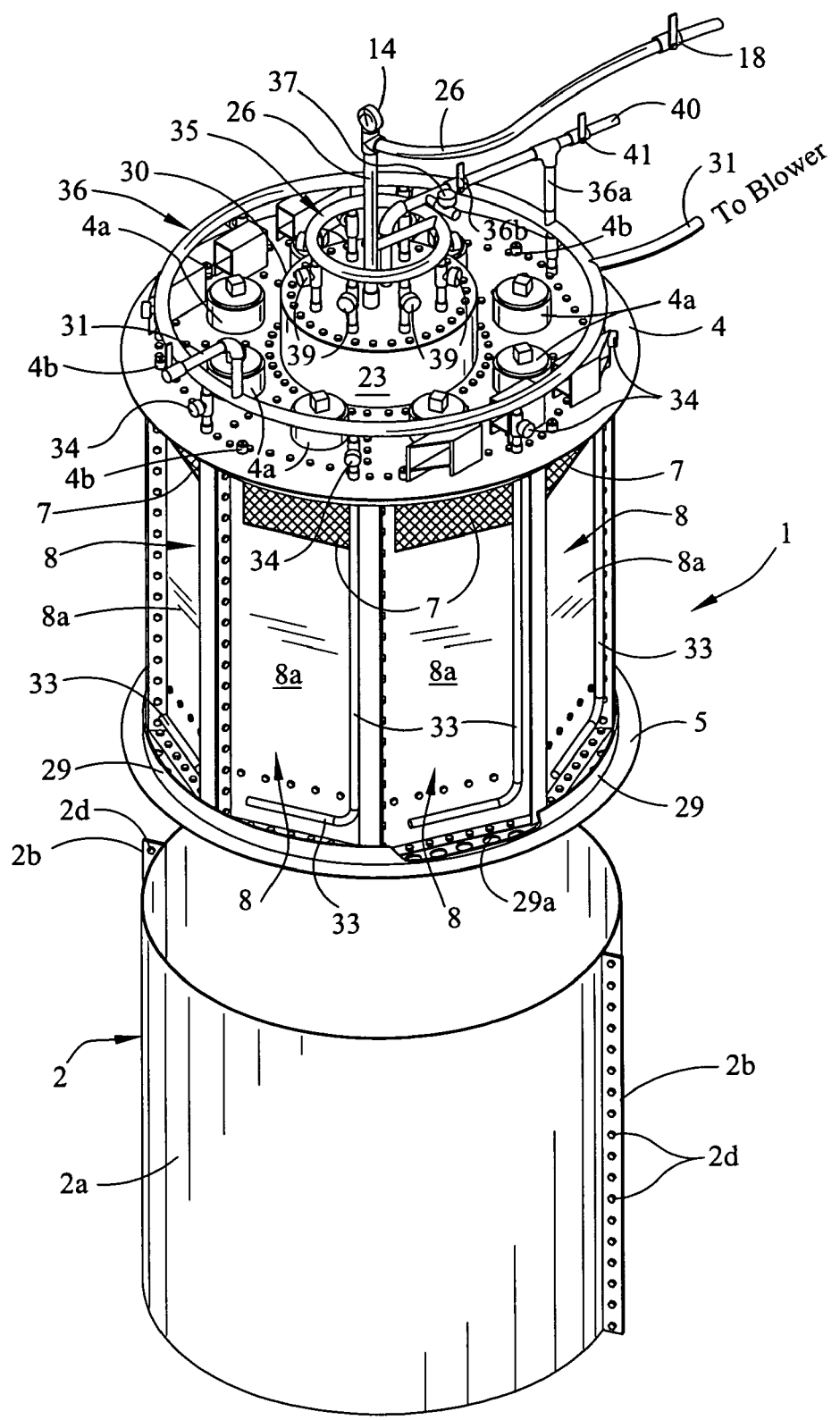
FIG. 2 is a perspective view, with the housing element removed, of the underwater filtration system illustrated in FIG. 1.
Figure 7:
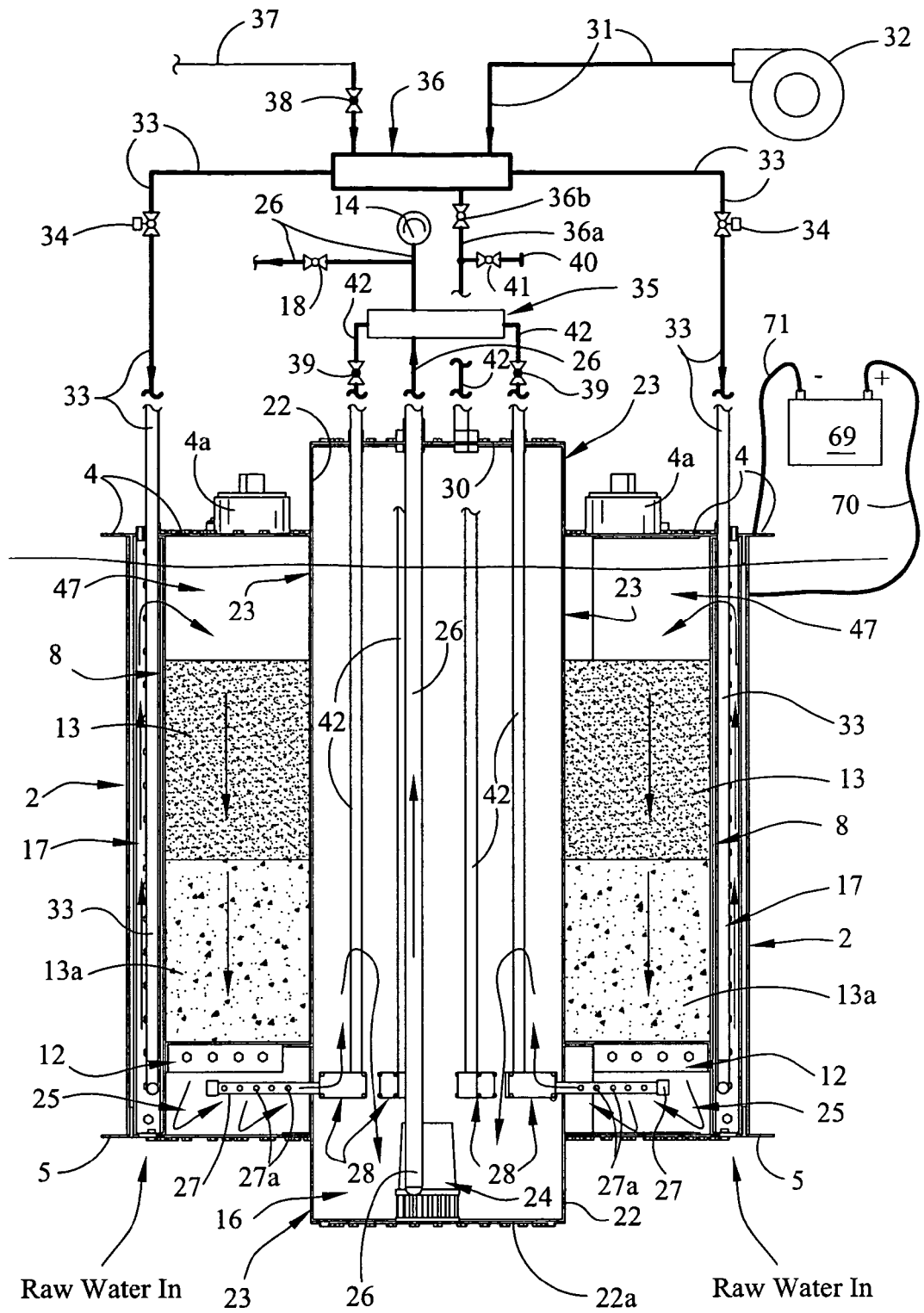
FIG. 7 is a longitudinal sectional view and schematic of the underwater filtration operator illustrated in FIG. 1, with the system disposed in filtration sequence.
Figure 8:
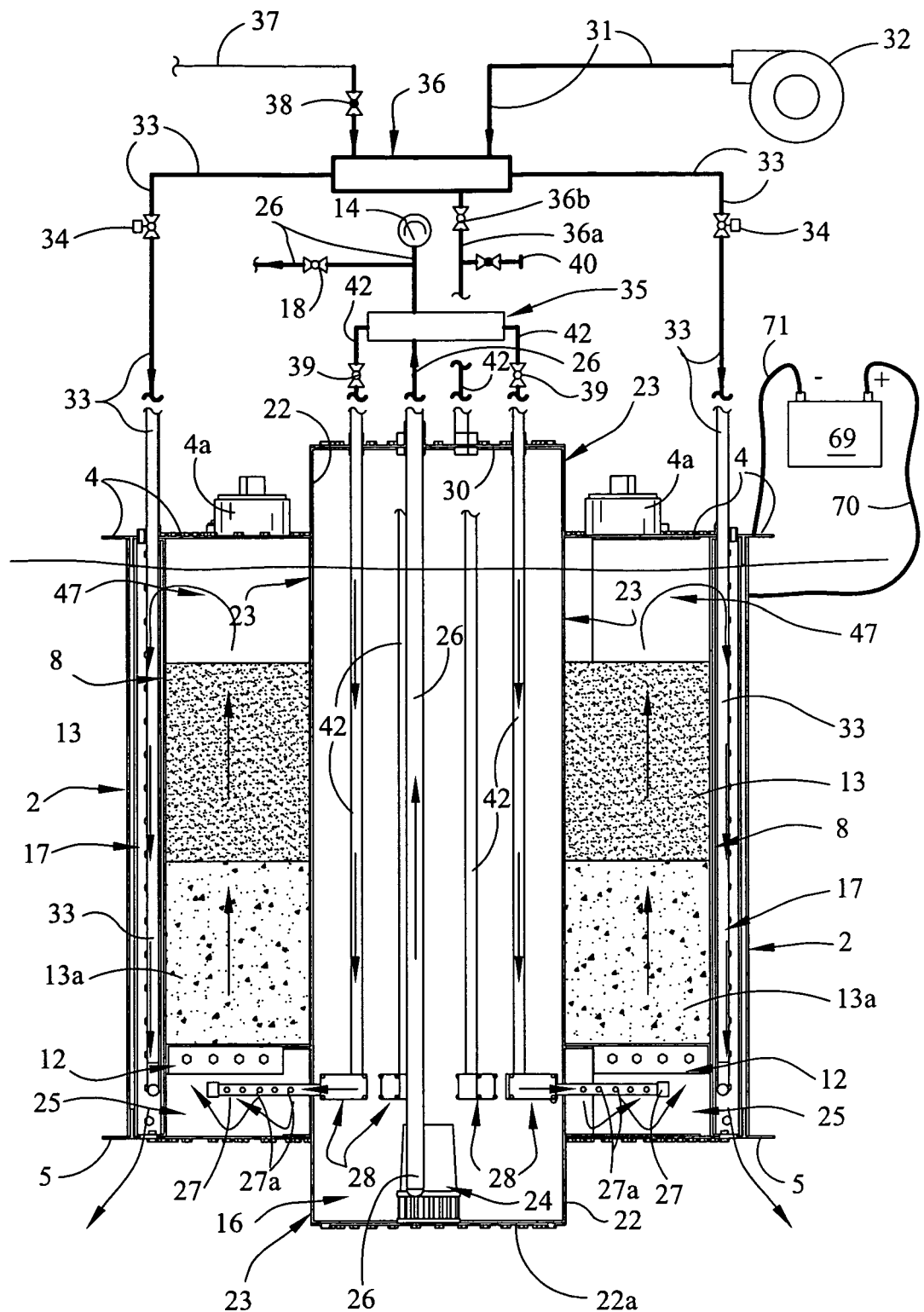
FIG. 8 is a longitudinal sectional view and schematic of the underwater filter operator illustrated in FIG. 1, with the system disposed in backwash sequence.

Referring initially to FIGS. 1-6 of the drawings, an illustrative embodiment of the underwater filtration system or operator of this invention is generally illustrated by reference numeral 1. The underwater filtration operator 1 is designed for flotation or otherwise positioning in a water body 43 (FIG. 1), such as a river, pond or lake to filter, clarify and selectively disinfect water from the water body 43 for drinking, additional processing or other purposes, as hereinafter described. A housing flotation collar 20, typically constructed of an expanded foam material such as STYROFOAM (trademark) or other suitable buoyant material, or alternatively, having an inner flotation chamber (not illustrated), may be mounted on the top housing panel 4 to impart buoyancy to the underwater filtration operator 1 in a water body 43, as illustrated in FIG. 1 and hereinafter described. In a first preferred embodiment, the underwater filtration operator 1 includes a split housing 2 which, as illustrated in FIGS. 1 and 2, can typically be cylindrical, and is typically shaped by a pair of half cylinders 2a, joined at diametrically-opposed cylinder flanges 2b, having flange bolt holes 2d (FIG. 2) for receiving flange bolts 2c, illustrated in FIG. 1 and cooperating nuts (not illustrated). The housing 2 is closed at the top by an oversized top housing panel 4 and an oversized bottom housing 5 (FIG. 2) closes the housing 2 at the bottom. The housing 2 encloses multiple filtration units 8 (FIG. 2), which are pie-shaped and separated from each other in the housing 2 by partitions 6 (FIGS. 3 and 4), which extend inwardly from the housing 2 to a pump housing 23 and between the top housing panel 4 and the bottom housing panel 5. While the embodiment of the underwater filtration operator 1 illustrated in the drawings typically includes eight filtration units 8, it is understood that any number of filtration units 8 can be contained in a housing 2 of any desired size and shape. As illustrated in FIGS. 7 and 8, each filtration unit 8 is fitted with an air vent opening 4b and typically includes an outermost, annular raw water chamber 17, defined by the housing 2 and each respective filtration unit cover 8a, which closes the corresponding filtration units 8 (FIG. 2). Each of the filtration unit covers 8a has a filtration screen 7 on the top thereof for receiving raw water from the raw water chamber 17 (FIG. 6) as hereinafter further described. Each of the filtration screen covers 8a is also mounted on a corresponding pie-shaped screen grid frame 12 at the bottom thereof and to a top flange 3 mounted on the top housing panel 4 and mounted to the bottom housing panel 5 (FIG. 5), using bolts (not illustrated). As hereinafter further described, the filtration units 8 each contain a selected top filter medium 13, such as coal or charcoal, for example, and a selected bottom filter medium 13a, such as, for example, sand. It will be appreciated by those skilled in the art that the filtration units 8 can be any desired size to contain any desired volume of any selected filter medium, including sand, charcoal, or the like, in non-exclusive particular, depending on the degree of filtration desired. Each of the filtration units 8 is designed to contain the selected particulate top filter medium 13 and/or the bottom filter medium 13a, in selected quantities, respectively.

Figure 3:
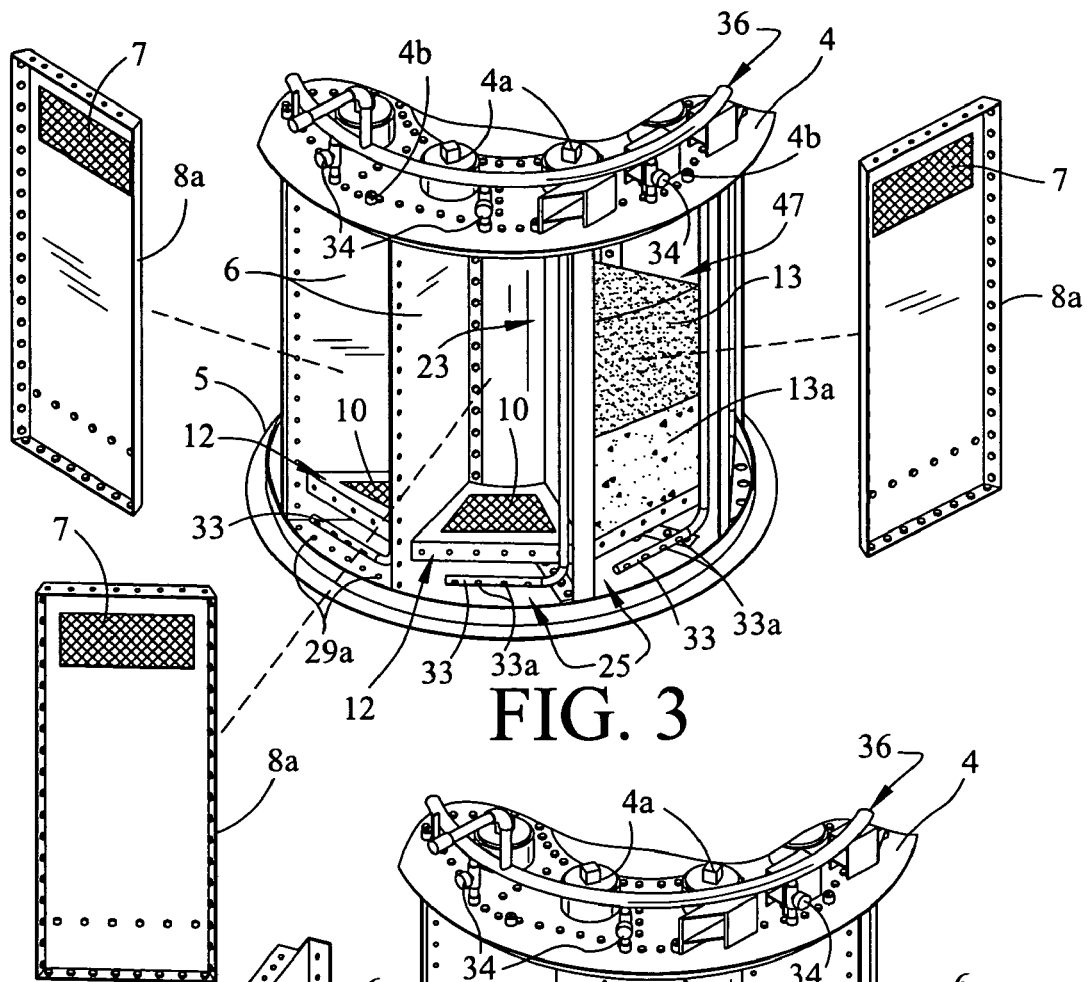
FIG. 3 is an exploded perspective view of the underwater filtration system illustrated in FIGS. 1 and 2, illustrating typical filtration unit cover elements and filtration units of the underwater filtration operator.
Figure 4:
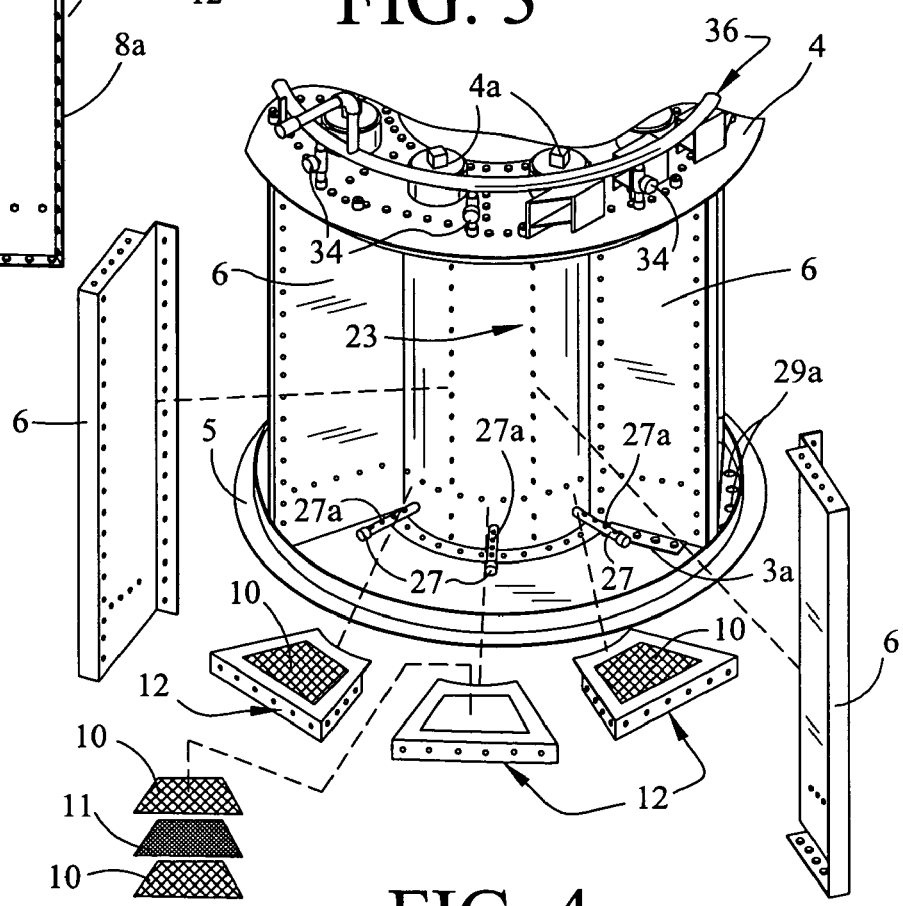
FIG. 4 is an exploded perspective view of the system illustrated in FIG. 3, more particularly illustrating filtration unit screen grid frames and screens in the underwater filtration system.

As illustrated in FIGS. 3 and 4, each of the pie-shaped screen grid frames 12 forms the bottom of a filtration unit 8 and typically includes a sieve screen 11, sandwiched between a pair of expanded metal screens 10 (FIG. 4). The screen openings of each sieve screen 11 are smaller in size than the particles of the top filter medium 13 or bottom filter medium 13a, respectively, to prevent inadvertent movement of the top filter medium 13 and bottom filter medium 13a downwardly, beyond the confines of the respective filtration units 8. As further illustrated in FIGS. 7 and 8, an air space 47 is defined between the bottom surface of the top housing panel 4 and the top filter medium 13 in the respective filtration units 8, to compensate for media expansion during the filter medium backwash cycles. As illustrated in FIGS. 1-5, 6 and 7, access caps 4a are typically provided to close corresponding openings (not illustrated) for accessing the respective filtration units 8 as necessary and changing or adding to the top filter medium 13 and/or the bottom filter medium 13a, respectively. The access caps 4a are typically threaded onto correspondingly-threaded receiving rings (not illustrated) provided on the top housing panel 4.

Referring again to FIGS. 5-7 of the drawings, each filtration unit 8 rests on a screen grid frame 12 and lies adjacent to a vertical pump chamber 16, defined by a pump housing 23, typically provided in the center of the housing 2. The pump housing 23 is typically characterized by a pump housing pipe 22 of selected size which extends upwardly from a pump housing bottom cover plate 22a. Multiple diffuser pipes 27 are located in the respective diffuser pipe chambers 25 and project from corresponding 3-way diverters 28 located in the pump chamber 16, into the respective filtration units 8 beneath screen grid frame 12 to establish water communication between the pump chamber 16 and the filtration units 8. A water pump 24, the purpose of which will be hereinafter described, is provided in the bottom of the pump chamber 16. The oversized bottom housing panel 5 extends radially outwardly from the pump housing 23 and typically terminates beyond each filtration unit 8, to define, between the respective filtration unit covers 8a and the inside of the housing 2, a housing cover flange 29 connected to the bottom housing panel 5, and having intake openings 29a. The intake openings 29a establish communication between the outside of the housing 2 and the raw water entering the underwater filtration operator 1 through the water openings 29a (FIG. 6). The multiple intake openings 29a are positioned to receive raw water into the annular raw water chamber 17. The pump housing 23 extends upwardly through the top housing panel 4 of the housing 2 and is typically closed by a removable top plate 30. A filtered water discharge pipe 26, provided in fluid communication with the discharge of the water pump 24, extends upwardly from the water pump 24, through the pump chamber 16 and through an air-sealed opening (not illustrated) provided in the plate 30, to a filtered water discharge storage facility or the like (not illustrated). A filtered water discharge valve 18 (FIG. 2) and a pressure gauge 14 is typically provided in the filtered water discharge pipe 26. An air introduction line 31 extends to an air manifold 36 and is connected at the other end to a blower 32 or a source of compressed air (not illustrated), for selectively introducing pressurized air from the air manifold 36, into the spaced-apart, radially-oriented, peripheral air pipes 33, having air pipe openings 33 (FIG. 2) for disinfectant and combining small particles during the electrical charging process hereinafter described. An air line 36a also projects from the air manifold 36 into the housing 2 and an air line valve 36b is provided in the air line 36a. An auxiliary line 40 extends from the air line 36a and includes an auxiliary line valve 41 therein for adding selected chemicals such as disinfectants, to the system or for venting air from pump chamber 16. An auxiliary air line 37 further extends to the air manifold 36 for possible introduction of chemical disinfectants into the annular raw water chamber 17, typically through an auxiliary air valve 38, provided in the auxiliary air line 37 (FIGS. 7 and 8), as hereinafter described.

Referring again to FIGS. 7 and 8 of the drawings, multiple filtered water receiving pipes 42 extend from the water manifold 35 through openings (not illustrated) provided in the top plate 30, and into the pump housing 23 and the pump chamber 16, where they connect to the corresponding respective three-way diverters 28 in the pump chamber 16. Each of the filter water receiving pipes 42 is fitted with a receiving pipe valve 39 for controlling the flow of water to and from the water manifold 35 as it is pumped through the respective filtered water receiving pipes 42 in the filtering and backwash cycles illustrated in FIGS. 7 and 8, respectively, as hereinafter described.

Figure 9:
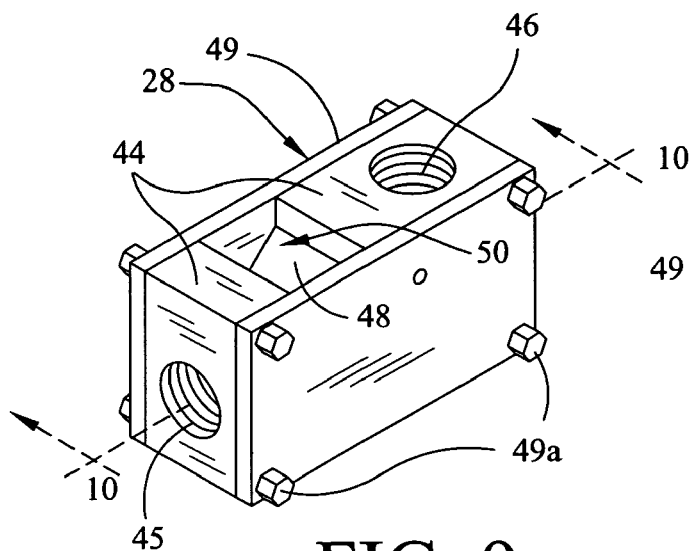
FIG. 9 is a perspective view of a three-way diverter element for determining the direction of filtered water flow in the underwater filtration system illustrated in FIGS. 2-8.
Figure 10:
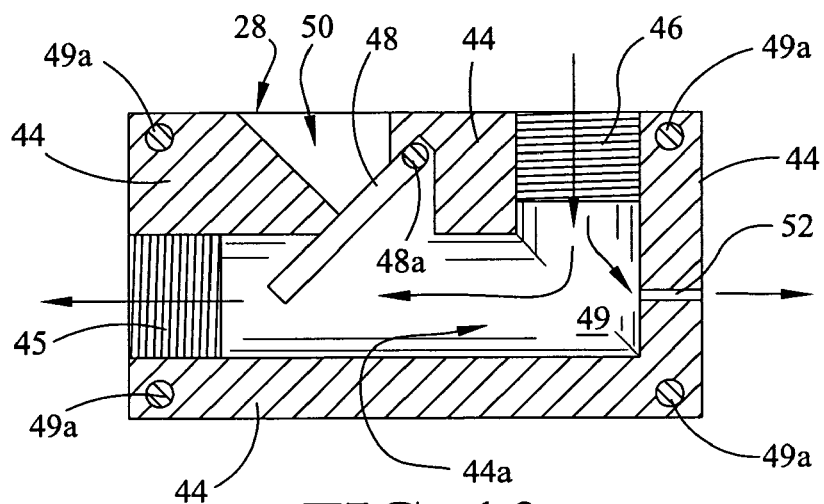
FIG. 10 is a sectional view, taken along section lines 10-10 of the 3-way diverter element illustrated in FIG. 9, with the diverter in backwash configuration.
Figure 11:
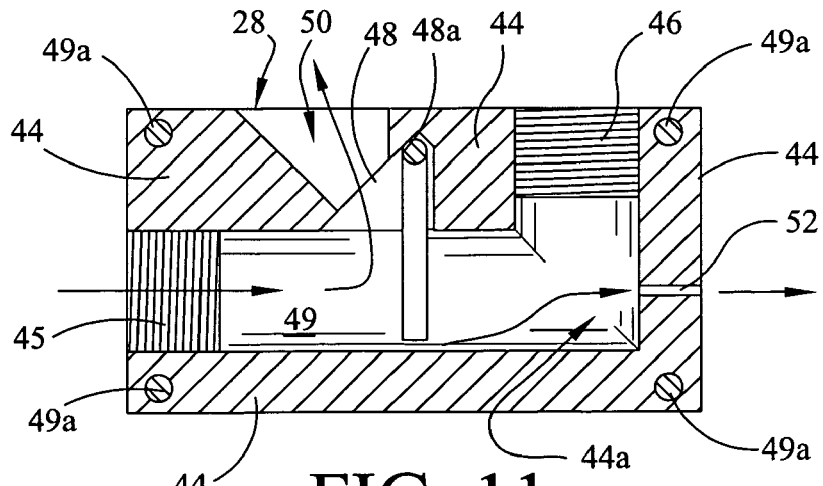
FIG. 11 is a sectional view, also taken along section lines 10-10 illustrated in FIG. 9, with the diverter in filtering configuration.

As illustrated in FIGS. 9-11 of the drawings, each of the three-way diverters 28, located in the pump chamber 16, is typically characterized by a diverter housing 44, provided with a horizontal pipe fitting 45 and a vertical pipe fitting 46, each of which interfaces with a housing interior 44a. A diverter 48 is pivotally attached to the diverter housing 44 in the housing interior 44a by means of a diverter pin 48a, as further illustrated in FIGS. 10 and 11 and the diverter pin 48a is able to swing from a first position illustrated in FIG. 10 to the second position illustrated in FIG. 11, responsive to water flow through the housing interior 44a, as hereinafter further described. Housing plates 49 serve to close the open sides of the diverter housing 44, typically using plate bolts 49a, as further illustrated in FIGS. 9-11. A flow opening 50 is provided in the top portion of the diverter housing 44 for accommodating a flow of water flowing from the housing interior 44a responsive to the position of the diverter 40a illustrated in FIG. 11, as hereinafter further described. A small bypass opening 52 is also provided in the housing 44 and communicates with the housing interior 44a (FIG. 11).

Referring now to FIGS. 1-4, 7 and 8-11 of the drawings, in typical operation of the underwater filtration operator 1, the filtered water discharge tube 26 is connected to a suitable water collection container or dispenser (not illustrated) and the air introduction tube 31 is connected to a blower 32 or alternative source of pressurized air (not illustrated). Appropriate electrical connections (not illustrated) are also made to facilitate operation of the water pump 24. The housing 2 is placed in the water body 43 such that the housing 2 initially floats on the water body 43 due to the buoyancy of the housing flotation collar 20, as illustrated in FIG. 1. Accordingly, the bottom of the housing 2 is normally suspended just beneath the surface of the water body 43, as illustrated in FIG. 1, typically by means of buoyancy imparted to the housing 2 by means of the housing flotation collar 20. As the housing 2 floats on the water body 43, raw water from the water body 43 is drawn first into the annular raw water chamber 17 adjacent to each filtration unit 8, through the respective raw water intake openings 29a located in the bottom housing panel 5 or cover flange 29 (FIGS. 2-4 and 6) of the housing 2, by opera-tion of the water pump 24. The raw water then flows through the respective filtration screens 7 (FIG. 2) in the corresponding filtration unit covers 8a and downwardly, through the top filter medium 13 and the bottom filter medium 13a, and finally as filtrate, through the respective diffuser pipe openings 27a in the diffuser pipes 27 extending into the corresponding filtration unit 8. From the diffuser pipes 27, the filtered water flows into the horizontal pipe fitting 45 and the housing interior 44a of the respective 3-way diverters 28, where it is directed upwardly through the open flow opening 50, into the pump chamber 16, by operation of the pivoting diverter 48 (FIG. 11). The water pump 24 pumps the filtered water in the pump chamber 16 upwardly through the filtered water discharge tube 26 into the water manifold 35 and through the open filtered water discharge valve 18, and finally, into a filtered water collection tank or dispenser to an additional treatment facility such as a reverse-osmosis unit (not illustrated). Accordingly, operation of the water pump 24 facilitates a continuous flow of the water from the water body 43 into the annular raw water chamber 17, through the respective filtration screens 7 in the corresponding filtration unit covers 8a of the filtration units 8 and through the top filter medium 13, the bottom filter medium 13a, the diffuser pipes 27 and the corresponding diverters 48, into the pump water chamber 16. In conjunction with the pumping process, the blower 32 is operated simultaneously therewith and air is caused to flow into the air manifold 36, through the opened air pipe valves 34 and the peripheral air pipes 33, having air pipe openings 33a and into the annular raw water chambers 17 (FIG. 7).

If all of the filtration units 8 are to be backwashed simultaneously, the filtered water discharge valve 18 is closed, the receiving pipe valves 39 opened and filtered water is pumped from an external source through the water manifold 35 and into the filtered water receiving pipes 42, as illustrated in FIG. 8, using an auxiliary water intake line (not illustrated) connected to the water manifold 35 and an external source of water. If only selected ones of the filtration units 8 are to be backwashed, the corresponding receiving pipe valves 39 are opened and the filtered water discharge valve 18 remains open. Selective backwash with filtered water production is thereby achieved. In both cases, as the water flows in reverse through the 3-way diverters 28 (FIG. 10) and the diffuser pipe openings 27a and top filter medium 13 and the bottom filter medium 13a, the top filter medium 13 and the bottom filter medium 13a are cleared of both large and small particulate impurities, as well as some bacteria and microorganisms. It will be appreciated by those skilled in the art that as the water flows through the selected filtration units 8 in this reverse, backwash mode, the water flowing into the respective filtration units 8 helps to "fluidize" the top filter medium 13 and bottom filter medium 13a, to expand the media into the respective air spaces 47 and effect a more complete cleansing of the medium. Furthermore, chlorine or other disinfectant chemicals can be introduced into the pre-filtered water through the auxiliary air line 37 and the air pipe openings 33a of the peripheral air pipes 33 by opening the auxiliary air line valve 38 in selected raw water chambers 17, to kill bacteria, algae and other microorganisms and ensure filtered water containing few or no live bacteria, algae or microorganisms which may otherwise evade the filtering process. The top filter medium 13 and the bottom filter medium 13a can be added to and removed from the respective-filtration units 8, respectively, and replaced with fresh or alternative filter medium, as deemed necessary, by accessing these pie-shaped chambers through a corresponding access opening (not illustrated) communicating with the air spaces 47 and provided in the top housing panel 4, after removing the respective access caps 4a, as described above.

As further illustrated in FIGS. 7 and 8, the underwater filtration operator 1 typically includes a split, vertically-flanged housing 2, designed as illustrated in FIGS. 1-6 and fitted with an extended top housing panel 4 that projects beyond the curved outer surface of the housing 2. In a preferred embodiment the housing 2 is positively charged with electricity by means of a positive lead 70 that connects to battery charger or battery 69, and a negative lead 71, connected to the top housing panel 4, for reasons more particularly hereinafter set forth. Insulation (not illustrated) is provided on the housing 2, to electrically isolate and insulate the housing 2 from the remainder of the underwater filtration operator 1. More specifically, in a preferred embodiment of the invention the cylindrically-shaped housing 2 is characterized by a pair of semi-cylindrically-shaped plates 2a, each having longitudinal cylinder flanges 2b, with spaced-apart flange openings 3 (FIG. 2) for bolting together using flange bolts 2c and nuts (not illustrated) to enclose the respective filtration units 8, as illustrated.

Referring again to FIGS. 7 and 8, the positive lead 70 of the battery or a battery charger 69 can be attached to the housing 2, while the negative lead 71 of the battery or the battery charger 69 is attached to the top housing panel 4 to facilitate applying an electrical potential to the top filter medium 13 and the bottom filter medium 13a. Accordingly, since raw water flowing from the water body 43 into the interior of the underwater filtration operator 1 through the raw water intake openings 29a contains negatively charged particles as impurities, these particles are neutralized as they contact the positively charged surface of the housing 2 and are therefore more effectively and efficiently filtered through the top filter medium 13 and the bottom filter medium 13a. The introduction of forced air from the air blower 32 through the peripheral air pipes 33, and the air pipe openings 33a, into selected raw water chambers 17 aids the charging process of the particles entering the selected raw water chambers 17. Consequently, creating a positive electrical charge on the incoming particles of sand, grit, clay and the like in the raw intake water, prevents these particles from being repelled by each other and facilitates a more effective filtration and coalescing of the particles together in the top filter medium 13 and the bottom filter medium 13a. The result of the more efficient filtration is exceptionally clear water which enters the pump chamber 16 and is pumped by means of the water pump 24 from the pump chamber 16 of the water filtration system 1, to storage, use or to an additional water treatment filter unit, such as a reverse osmosis unit, as desired.

It will be appreciated by those skilled in the art that as heretofore described, the underwater filtration operator 1 of this invention can be selectively operated in a backwash cycle without the use of an external clear water storage tank to remove impurities, filtered from the water, from the top filter medium 13 and the bottom filter medium 13a, respectively, by reversing the direction of water flow through the respective filtration units 8 individually or in any desired combination. This is accomplished as described in detail above by opening the respective receiving pipe valves 39 of the respective filtered water receiving pipes 42 that serve the filtration units 8 to be backwashed and pumping filtered water from the pump chamber 16, through the filtered water receiving pipes 42. This action, illustrated in FIG. 8, forces the filtered water in the pump chamber 16 upwardly through the bottom filter medium 13a and the top filter medium 13 in the respective filtration units 8 and into the raw water chamber 17. The reverse flow of water through the bottom filter medium 13a and the top filter medium 13, respectively, of each filtration unit 8, as described above, removes all or most of the filtered particles and some microorganisms from the top filter medium 13 and the bottom filter medium 13a of each filtration unit 8, and directs these impurities back into the water body 43. Furthermore, when the water is forced through the bottom filter medium 13a and the top filter medium 13, the air space 47 in each of the filtration units 8 enables the top filter medium 13 and the bottom filter medium 13a to expand and fill the entire volume of the respective inner filtration units 8. Accordingly, the top filter medium 13 and bottom filter medium 13a become fluid in the filtration units 8, respectively, and this facilitates a thorough cleansing of the top filter medium 13 and bottom filter medium 13a.

Referring again to FIG. 1 of the drawings, it will be appreciated by those skilled in the art that the housing flotation collar 20 is particularly suitable for suspending the housing 2 beneath the surface of the water body 43 under circumstances in which the level of the water body 43 is subject to fluctuation. Alternatively, it is understood that the housing 2 can be positioned beneath the surface of the water body 43 by securing the housing 2 to a dock, barge, piling or the like (not illustrated). It will be further appreciated by those skilled in the art that the controls for the various valves, both air and water, may be provided in a land-based control panel (not illustrated) for convenient, expedient and/or automated operation of the underwater filtration operator 1. Furthermore, it is also understood that any source of direct electric current, in addition to a battery charger can be used to supply the desired potential across the filter media.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. An underwater filtration operator for floating in a water body and filtering water in the water body, comprising: a housing; a plurality of filtration units provided in said housing; at least one filter medium provided in each of said filtration units, respectively, for filtering water from the water body; a pump housing provided in said housing for receiving the water from said filtration units, respectively; a plurality of raw water chambers disposed between said filtration units and said housing, said raw water chambers provided in water communication with said water body, said filtration units and said pump housing; a plurality of filtered water-receiving pipes provided in said pump housing, said filtered water-receiving pipes provided in water communication with said pump housing and said filtration units, respectively, for backwashing said filter medium; and a water diverter having a pivoting diverter plate provided on each of said filtered water-receiving pipes for diverting filtered water from said pump housing and said filtered water-receiving pipes to the filter medium, and a water pump provided in said pump housing for pumping the water from the water body into said raw water chambers, through said filtration units and said filter medium and into said pump housing and selectively from said pump housing, through said filtered water-receiving pipes and said water diverter, responsive to said pivoting of said pivoting diverter plate into a backwash configuration.

2. The underwater filtration operator of claim 1 wherein said at least one filter medium comprises at least two filter media provided in stacked relationship with respect to each other in said plurality of filtration units, respectively.

3. The underwater filtration operator of claim 1 comprising a housing flotation collar provided on said housing for floating said housing in the water body.

4. The underwater filtration operator of claim 3 wherein said at least one filter medium comprises a pair of filter media provided in adjacent relationship with respect to each other in said plurality of filtration units, respectively.

5. The underwater filtration operator of claim 1 comprising a plurality of perforated water inlet plates provided in said housing at said raw water chambers, respectively, for receiving water from the water body.

6. The underwater filtration operator of claim 5 wherein said at least one filter medium comprises a sand filter medium and a charcoal filter medium provided in said plurality of filtration units, respectively and comprising a housing flotation collar provided on said housing for floating said housing in the water body.

7. The underwater filtration operator of claim 1 comprising a source of electric current connected to said housing for applying a positive charge on said housing when the raw water is flowing through said raw water chambers from the water body and a source of compressed air applied to selected ones of said filtration units.

8. The underwater filtration operator of claim 7 wherein said at least one filter medium comprises at least two filter media disposed in said plurality of filtration units, respectively, and comprising a plurality of air pipes connected to a source of compressed air, said air pipes provided in air communication with said raw water chambers, respectively.

9. The underwater filtration operator of claim 8 comprising a housing flotation collar provided on said housing for floating said housing in the water body.

10. The underwater filtration operator of claim 9 comprising a water manifold provided on said housing in water communication with said pump housing and an air manifold provided on said housing in air communication with said plurality of air pipes and said source of compressed air for directing the water and air flow through said filtration units.

11. An underwater filtration operator for floating in a water body and filtering water in the water body, comprising: a housing charged with electricity; a plurality of filtration units provided in said housing; at least one filter medium provided in each of said plurality of filtration units, respectively, for receiving the water from the water body; a pump housing provided in said housing for receiving the water from said plurality of filtration units and said filters, respectively; a plurality of raw water chambers disposed between said housing and said pump housing, said raw water chambers provided in water communication with said water body and said filtration units; a plurality of filtered water-receiving pipes provided in said pump housing, said filtered water-receiving pipes provided in water communication with said pump housing and said filtration units, respectively; and a water diverter having a pivoting diverter plate provided on each of said filtered water-receiving pipes; and a water pump provided in said pump housing for pumping the filtered water from said pump housing, through said filtered water-receiving pipes and said water diverter and through said filtration units and said filter medium and backwashing said filter medium responsive to positioning of said diverter plate in a backwash configuration.

12. The underwater filtration operator of claim 11 wherein said at least one filter medium comprises at least two selected filter media provided in stacked relationship with respect to each other in said plurality of filtration units, respectively.

13. The underwater filtration operator of claim 12 comprising a source of compressed air provided in pneumatic communication with said raw water chambers and said filtration units for selectively introducing compressed air into said filtration raw water chambers and a source of electric current connected to said housing for electrically charging said housing.

14. An underwater filtration operator for filtering water in a water body comprising: a housing; a plurality of filtration units provided in said housing, with at least one of said filtration units positively charged with electricity; at least one filter medium provided in said plurality of filtration units, respectively, for receiving the water from the water body; a pump chamber housing in said housing for receiving the water from said plurality of filtration units, respectively; a plurality of raw water chambers disposed between said housing and said pump chamber, said raw water chambers provided in water communication with said water body and said filtration units; a plurality of filtered water-receiving pipes provided in said pump housing, said filtered water-receiving pipe provided in water communication with said pump housing and said filtration units, respectively; a water diverter having a pivoting diverter plate provided on each of said filtered water-receiving pipes for selectively diverting filtered water from said filtered water-receiving pipes and through said water diverter to the filter medium; a water pump provided in said pump chamber for selectively pumping the water from said pump chamber, through said filtered water-receiving pipes and said diverter to the filter medium responsive to pivoting of said diverter plate in said water diverter; a plurality of air pipes provided in said housing, said air pipes extending to said filtration units and said raw water intake; a source of compressed air provided in pneumatic communication with said air pipes and said raw water intake for selectively introducing compressed air into said raw water intake, and a source of electric current connected to said housing for electrically charging said housing.

15. The water filtration system of claim 14 comprising a housing flotation collar provided on said housing for floating said housing in the water body.

* * * * *